United States Patent

Shinoda

[11] Patent Number: 4,463,741
[45] Date of Patent: Aug. 7, 1984

[54] ELECTRONICALLY CONTROLLED EXHAUST GAS RECIRCULATION APPARATUS

[75] Inventor: Kazuo Shinoda, Toyota, Japan

[73] Assignee: Toyota Jidosha Kabushiki Kaisha, Aichi, Japan

[21] Appl. No.: 425,261

[22] Filed: Sep. 28, 1982

[30] Foreign Application Priority Data

Oct. 30, 1981 [JP] Japan ............... 56-174229
Dec. 22, 1981 [JP] Japan ............... 56-207387

[51] Int. Cl.³ ............................... F02M 25/06
[52] U.S. Cl. ............................ 123/571; 123/568; 123/569
[58] Field of Search ............... 123/571, 569, 568

[56] References Cited

U.S. PATENT DOCUMENTS

| 4,009,700 | 3/1977 | Engels et al. | 123/571 |
| 4,066,056 | 1/1978 | Nohira et al. | 123/571 |
| 4,130,094 | 12/1978 | Gropp | 123/571 |
| 4,280,470 | 7/1981 | Ueda | 123/569 |
| 4,333,438 | 6/1982 | Perez et al. | 123/569 |

Primary Examiner—Wendell E. Burns
Attorney, Agent, or Firm—Parkhurst & Oliff

[57] ABSTRACT

Vacuum is applied to a pair of vacuum chambers on opposite sides of a diaphragm of an EGR valve and air flow rates from the pair of Vacuum Chambers are determined by a duty factor of an electrical control signal. A plunger driven by the diaphragm and a slit mechanism which changes its opening area in accordance with a change of stroke of the plunger are arranged in the EGR valve and the diaphragm is stopped at an equilibrium position of the pressures of the pair of vacuum chabers. The stroke of the EGR valve thus can be exactly controlled only by the control signal.

10 Claims, 9 Drawing Figures

ELECTRONICALLY CONTROLLED EXHAUST GAS RECIRCULATION APPARATUS

BACKGROUND OF THE INVENTION

1. Field of the Invention

The present invention relates to an electronically controlled exhaust gas recirculation (EGR) appratus which recirculates a portion of exhaust gas to an intake system of an engine under a predetermined condition to reduce a $NO_x$ content.

2. Description of the Prior Art

An exhaust gas recirculation (EGR) apparatus recirculates a portion of inactive exhaust gas to a intake system and mixes it with intake gas mixture to lower a combustion temperature in order to reduce production of $NO_x$ content in the exhaust gas.

In the ERG, a portion of the exhaust gas is fed from an exhaust manifold to a intake manifold through an EGR valve. With a trend of electronization of controls for an automobile, the electronization of the EGR apparatus has also been desired. In one example, an electronic control is effected by utilizing the EGR valve. In this case, a vacuum is applied to a diaphragm to control the opening of the EGR valve. In order to attain the electronic control by using a conventional EGR valve, a pressure adjusting device having a solenoid valve which is controlled by an electronic circuit is arranged in a path which supplies an intake manifold vacuum or a vacuum from a vacuum source such as a vacuum pump, to control the opening of the EGR valve by the vacuum adjusted by the pressure adjusting device. The intake manifold vacuum of the engine or a vacuum pump driven by the engine is usually used as a vacuum source to the pressure adjusting device.

However, in such a prior art system which used the EGR valve, the opening of the EGR valve changes with a variation of pressure of the vacuum source. As a result, it is not possible to uniquely and exactly control the opening of the EGR valve.

SUMMARY OF THE INVENTION

It is an object of the present invention to provide an electronically controlled EGR apparatus which exactly controls the opening of the EGR valve by an electronic circuit.

According to the present invention, in the EGR apparatus which controls EGR quantity based on an electrical signal, vacuum is applied to both chambers on opposite sides of a diaphragm of the EGR valve, and blow-out air quantities from both vacuum chambers are determined by a duty factor of the electrical signal, and a plunger driven by the diaphragm and a slit having its aperture area changed by a change of plunger stroke are arranged in the EGR valve so that the diaphragm is stopped at an equilibrium position of the pressures of the upper and lower vacuum chambers.

DETAILED DESCRIPTION OF THE PREFERRED EMBODIMENTS

Figure 1:
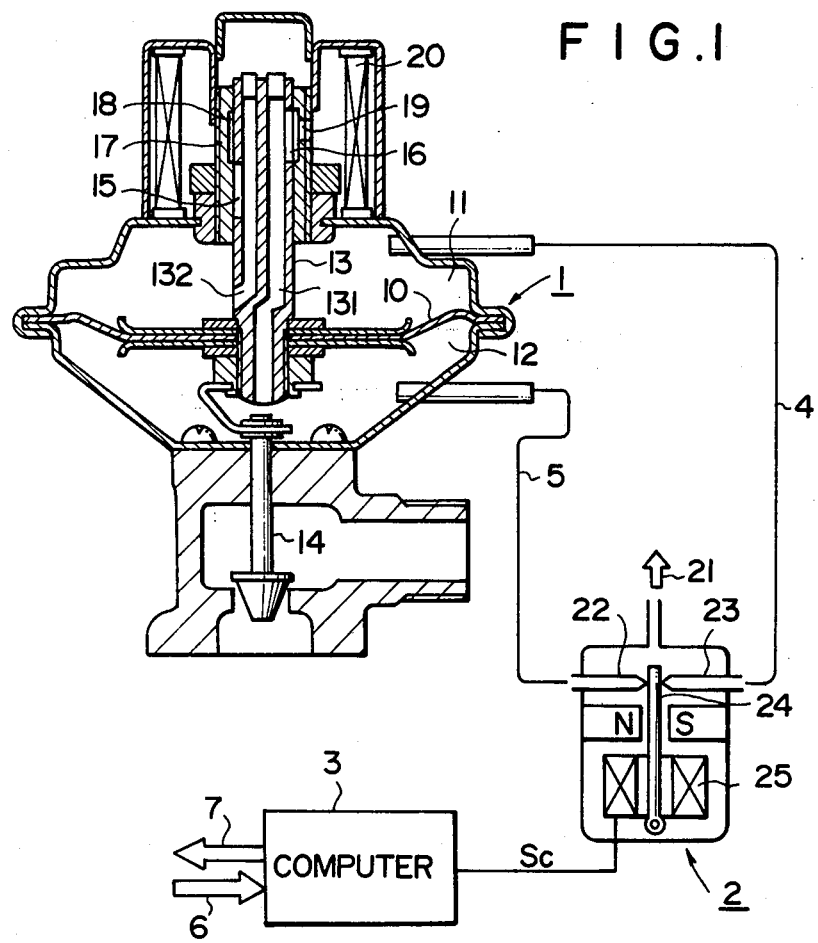
FIG. 1 shows a construction of one embodiment of the present invention.

FIG. 1 shows a construction of a first embodiment of the present invention. The present embodiment comprises an EGR valve 1, a control valve 2 and a computer 3. The EGR valve 1 comprises a diaphragm 10, vacuum chambers 11 and 12 sectioned by the diaphragm 10, a plunger 13 which is perpendicular to the diaphragm 10 at a center thereof and has passages 131 and 132 having ends thereof extending into the vacuum chambers 11 and 12 and communicating with the respective vacuum chambers, a valve 14 coupled to an end of the vacuum chamber 12 to control the EGR quantity, slits 15 and 16 formed at an end of the plunger 13 of the vacuum chamber 12 and communicating with the passages 131 and 132, a sleeve 17 covering an end of the plunger 13 to encircle the slits 15 and 16, a groove 18 formed in an inner periphery of the sleeve 17 to form a passage as the slits 15 and 16 move up and down, an aperture 19 for connecting the groove 18 to an atmosphere, and an air filter 20 arranged on an outer periphery of the sleeve 17 to prevent dusts from entering into the EGR valve 1.

The plunger 13 slides up and down in the sleeve 17 together with the diaphragm 10. The slits 15 and 16 open to the groove 18 in accordance with the stroke of the plunger 13 so that the vacuum chambers 11 and 12 communicate with the atmosphere. The valve 14 moves up and down in accordance with the stroke of the plunger 13 to control a flow rate of the exhaust gas.

The control valve 2 is connected to a vacuum source 21. It comprises flapper valves 22 and 23 connected to the vacuum chambers 11 and 12 of the EGR valve 1 to control a flow rate of air to the vacuum chambers 11 and 12, an armature 24 which is moved to the left and right as viewed in FIG. 1 in a clearance between the flapper valves 22 and 23, and a coil 25 for swinging the armature to the left or right in accordance with a control signal. Thus, depending on the excitation of the coil 25, the armature 24 is swung to the left or right so that one of the flapper valves 22 or 23 is communicated with the vacuum source 21. The flapper valve 22 and the vacuum chamber 11 are connected through a hose 4, and the flapper valve 23 and the vacuum chamber 12 are connected through a hose 5.

The computer 3 comprises an output control device, a CPU, an input device and a memory, which are not shown. It may be a microcomputer. An input signal 6 may include a rotation speed of the engine, a load condition, a coolant temperature and a suction air temperature. The computer 3 calculates a stroke quantity to control the EGR valve 1 based on the input data and sends out a control signal to the control valve 2. The computer 3 also calculates a fuel quantity and produces an output signal 7. When the computer 3 is a microcomputer, it can carries out a plurality of operations (that is, a plurality of controls) parally.

Figure 2:
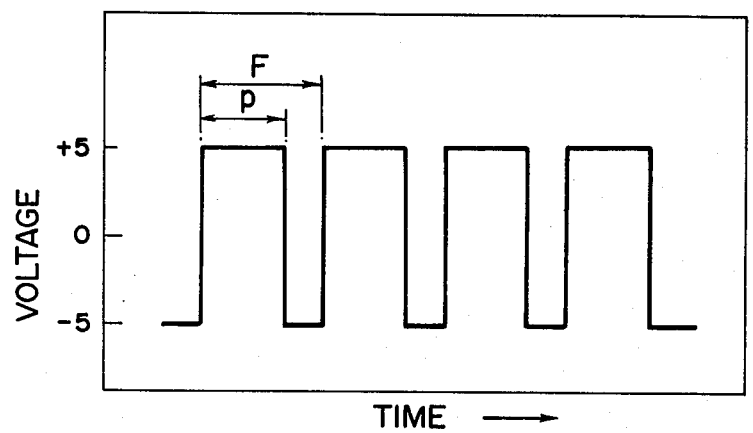
FIG. 2 shows a waveform of a control signal in the embodiment of FIG. 1.

FIG. 2 shows a waveform of the control signal sent out from the computer 3 to the control valve 2. The air flow rate from the vacuum pump (vacuum source 21) is controlled by a ratio of an on period P to a cycle period F, that is, a duty ratio.

Figure 3:
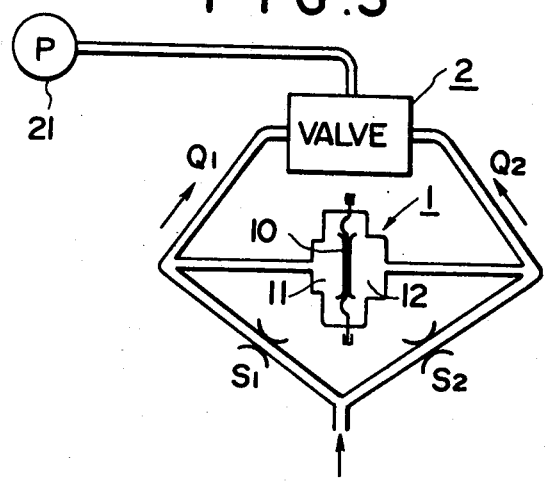
FIG. 3 shows a system diagram for explaining the operation of the present invention.

FIG. 3 shows a system diagram for explaining the operation of the present invention. $S_1$ and $S_2$ denote opening areas of the slits 15 and 16, and $Q_1$ and $Q$ denote air flow rates in the hoses 4 and 5. In an equilibrium condition of the pressures of the vacuum chambers 11 and 12, the air flow rates $Q_1$ and $Q_2$ and the opening areas $S_1$ and $S_2$ of the slits 15 and 16 meet the following relation:

$$P/F = Q_1/(Q_1+Q_2) = S_1/(S_1+S_2) \quad (1)$$

On the other hand, a relation between the slits 15 and 16 is uniquely defined by the stroke of the diaphragm 10. Accordingly, the stroke of the EGR valve 1 is uniquely determined by the duty ratio of the control signal $S_c$ from the computer 1 and is not affected by the vacuum of the vacuum source 21.

In such an equilibrium condition, if the duty ratio of the control signal $S_c$ suddenly changes, the term $Q_1/(Q_1+Q_2)$ in the formula (1) suddenly changes and the pressures in the vacuum chambers 11 and 12 changes. As a result, the diaphragm 10 is moved to a position at which $S_1/S_1+S_2)$ is equal to the duty ratio, and stops there to again resume the equilibrium condition.

In this manner, by determining the air flow rates from the lower and upper vacuum chambers 11 and 12 by the duty factor from the computer 3 and changing the opening areas defined by the slits 15 and 16 and the sleeve 17 in accordance with the movement of the diaphragm 10, the pressures of the vacuum chambers 11 and 12 can be equilibrated so that the stroke of the EGR valve 1 can be uniquely determined by the control signal without being affected by the vacuum source.

Figure 4:
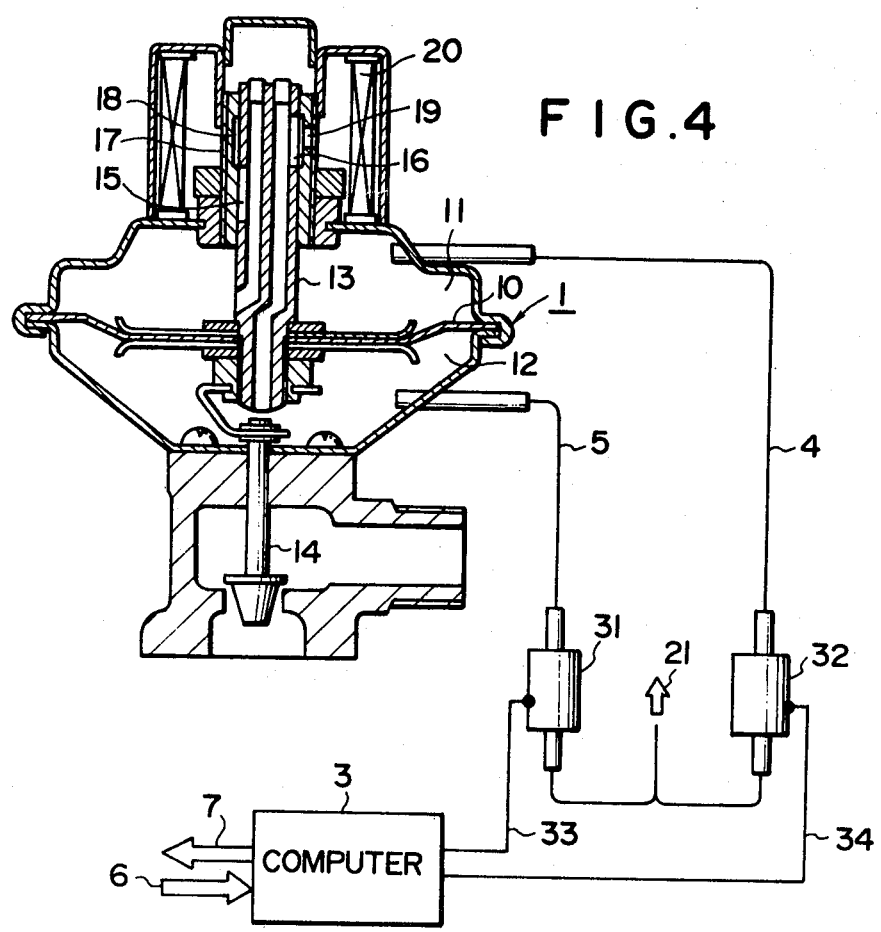
FIG. 4 shows a construction of a second embodiment of the present invention.

FIG. 4 shows a construction of a second embodiment of the present invention.

In the present embodiment, the flapper valves of the embodiment shown in FIG. 1 are replaced by two solenoid valves which supply vacuum from the vacuum source to the vacuum chambers of the EGR valve.

Figure 5:
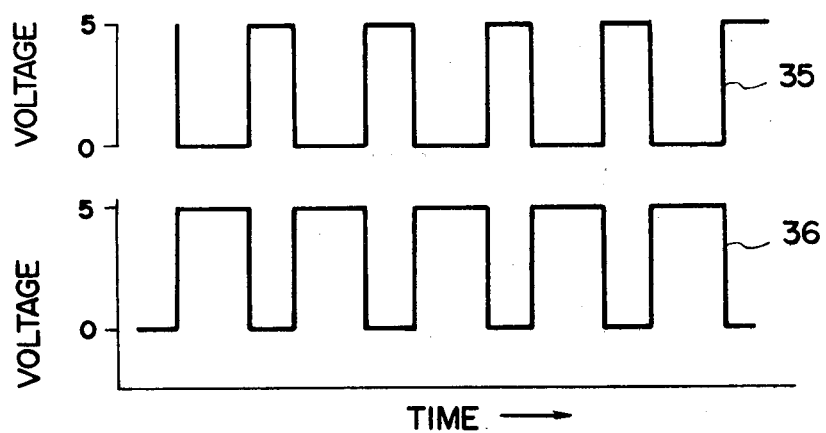
FIG. 5 shows a waveform of a control signal in the second embodiment of FIG. 4.

The computer 3 produces control signals 35 and 36 having duty factors as shown in FIG. 5 to drive the solenoid valves 31 and 32 order to control the vacuums of the vacuum chambers 11 and 12. In the present embodiment, the solenoid valve 31 corresponds to the flapper valve 22 and the solenoid valve 32 corresponds to the flapper valve 23. Similar functions to those of the flapper valves 22 and 23 are attained by the solenoid valves 31 and 32. The other construction is identical to that of the embodiment of FIG. 1 and hence the explanation thereof is omitted.

Figure 6:
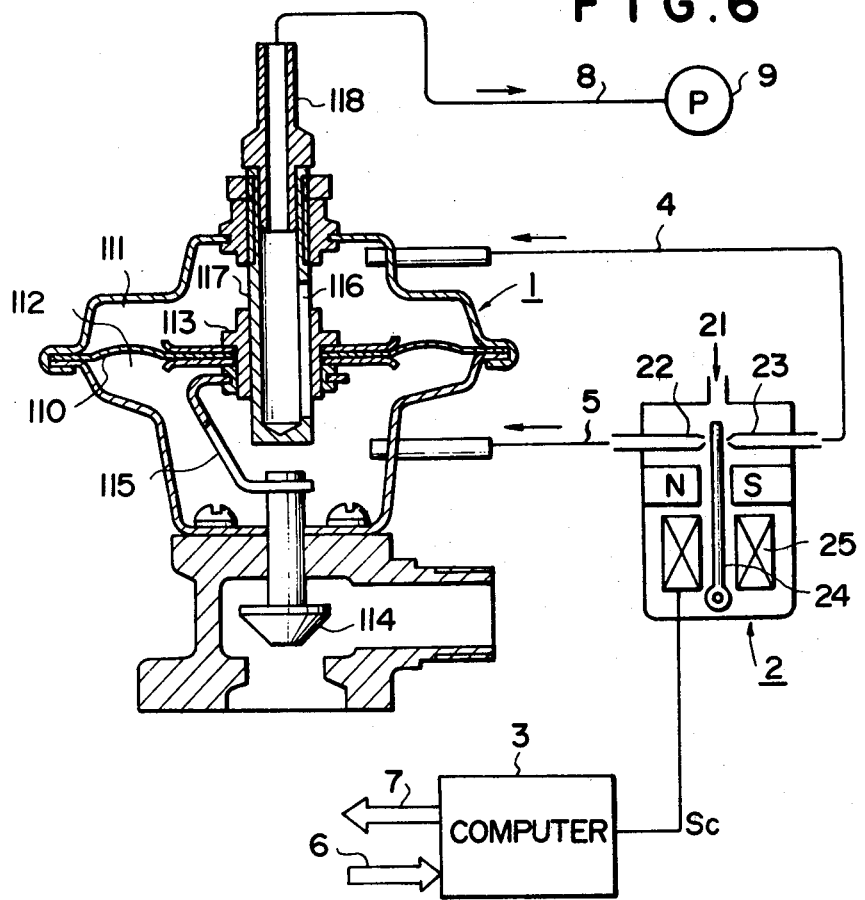
FIG. 6 shows a construction of a third embodiment of the present invention.

FIG. 6 shows a construction of a third embodiment of the present invention. In the present embodiment, the structure of the slits 15 and 16 in the embodiment of FIG. 1 are modified, and other construction is identical to that of the embodiment of FIG. 1. The overall construction of the present embodiment comprises an EGR valve 1, a control valve 2 and a computer 3. The EGR valve 1 comprises a diaphragm 110, vacuum chambers 111 and 112 sectioned by the diaphragm 110, a hollow slider 113 axially fixed at a center of the diaphragm 110, a connecting plate 115 which extends from a side of the slider 113 to drive a valve 14 mounted at a bottom of the EGR valve 1, a slidable guide pin 117 inserted in the slider 113 and having an opening (slit) 116 on a side thereof which communicates with the vacuum chambers 111 and 112 and having an end thereof fixed to the top of the EGR valve 1, and a hose union 118 inserted in the guide pin 117 and fixed to the top of the guide pin 117. A vacuum pump 9 is connected to the hose union 118 through the hose 8.

As the diaphragm 110 moves up and down, the valve 114 moves, and the opening area of the opening 116 communicating with the vacuum chambers 111 and 112 changes with the movement of the valve 114. As a result, the air flow rates from the vacuum chambers 111 and 112 to the vacuum pump 110 through the opening 116 are controlled by the stroke of the diaphragm 110 so that the flow rate of the exhaust gas through the valve 114 is controlled.

The control valve 2 has a function to supply atmosphere 21 to the vacuum chambers 111 and 112 of the EGR valve 1 at a predetermined ratio. The construction and the operation are same as those described before. The construction and the operation of the computer 3 are also same as those described before and hence the explanation thereof is omitted. The waveform of the control signal sent out from the computer 3 to the control valve 2 is shown in FIG. 2.

In the present embodiment, when a frequency of the control signal $S_c$ from the computer 3 is sufficiently high, the air flow rate to the vacuum chambers 111 and 112 which is determined by the duty ratio of the control signal $S_c$ can be controlled by a duty ratio of the signal applied to the control valve 2. When the air flow rate to the vacuum chamber 111 decreases, the vacuum in the vacuum chamber 111 increases, and when the air flow rate to the vacuum chamber 112 increases, the vacuum in the vacuum chamber 112 decreases. As a result, the diaphragm 110 is pushed up as viewed in FIG. 6. As the diaphragm 110 is pushed up, the slider 113 moves upward to reduce the opening area of the opening 116 communicating the vacuum chamber 111 so that the vacuum in the vacuum chamber 111 is reduced. Simultaneously, the opening 116 increases the opening area communicating with the vacuum chamber 112 so that the vacuum in the vacuum chamber 112 is increased. Such increase and decrease of the vacuum are continued until the pressures of the vacuum chambers 111 and 112 become equal, that is when the diaphragm 110 stop its upward movement. In this manner, the position of the slider 113 is determined by the air flow rates from the control valve 2 to the vacuum chambers 111 and 112 and the opening area of the EGR valve 1 is determined. Thus, the lift of the EGR valve 1 can be determined by the duty ratio of the control signal from the computer or the electronic control apparatus.

Figure 7A:
FIGS. 7(a) and 7(b) show front views of shapes of an opening.
Figure 7B:

The shape of the opening 116 may be a slit having the same width over an entire length thereof. In this case, the stroke of the valve is proportional to the duty ratio. When a non-linear characteristic of the opening of the valve 114 is desired, the width of the slit is changed along the length. In order to finely control the lift of the EGR valve to the change of the duty ratio at an initial stage of valve opening operation, the width of the lower portion of the opening 116 is widened to increase the change of the opening area to the lift at the lower portion of the slit. FIG. 7(a) shows a shape of the slit which provide a linear relation between the duty ratio and the lift, and FIG. 7(b) shows a shape of the slit which enables the fine control of the lift to the duty ratio at the initial stage of the valve opening operation.

In the equilibrium condition of the diaphragm, if the duty ratio of the control signal $S_c$ from the computer 3 suddenly changes, the pressures in the vacuum chambers 111 and 112 change. As a result, the diaphragm 110 is moved to a position corresponding to the duty ratio and stop there to again assume the equilibrium condition.

In this manner, by determining the air flow rates to the upper and lower vacuum chambers by the duty ratio from the computer 3 and changing the opening areas defined by the slits and the slider in accordance with the movement of the diaphragm, the pressures of the vacuum chambers 111 and 112 can be equilibrated. As a result, the stroke of the EGR valve can be uniquely determined by the control signal without being affected by the vacuum source.

Figure 8:
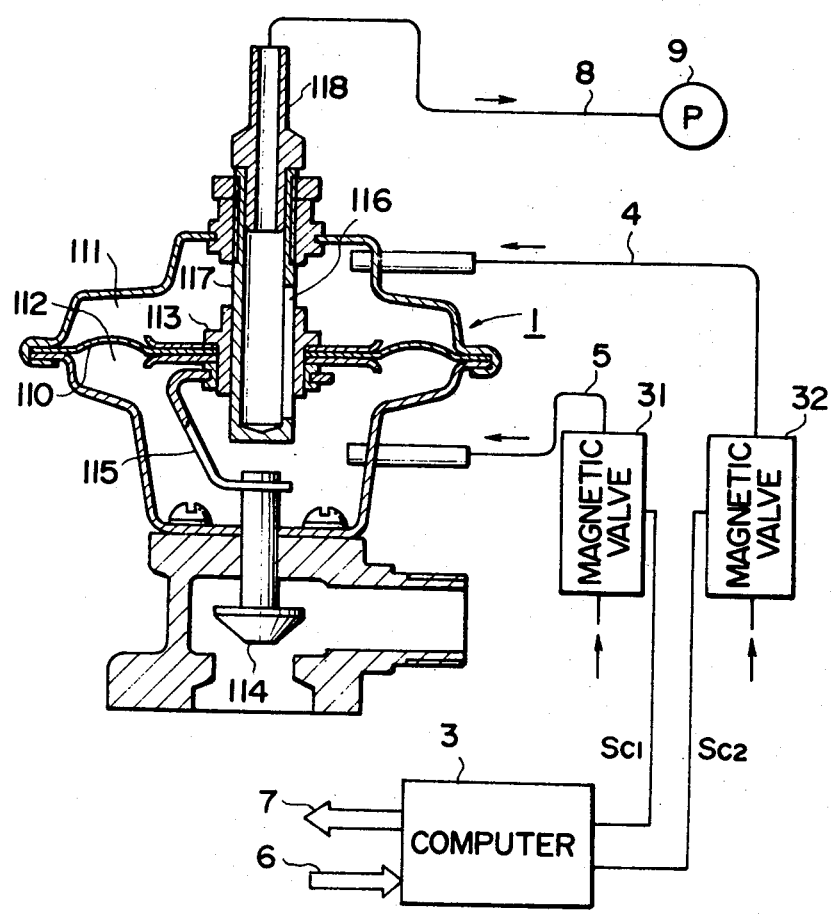
FIG. 8 shows a construction of a fourth embodiment of the present invention.

FIG. 8 shows a construction of a further embodiment of the present invention.

In the present embodiment, the flapper valves shown in the embodiment of FIG. 6 are replaced by two solenoid valves which supply the vacuum from the vacuum source to the vacuum chambers of the EGR valve. The construction of this portion corresponds to that shown in the embodiment of FIG. 4.

The computer 3 produces a positive voltage shown in FIG. 2 as an output signal (control signal) $S_{c1}$, and an inverted negative voltage as an output signal (control signal) $S_{c2}$. The solenoid valves 31 and 32 are driven by those signals to control the vacuums of the vacuum chambers 111 and 112. The other construction is identical to that of the embodiment of FIG. 6 and hence the explanation thereof is omitted.

As described hereinabove, according to the present invention, the stroke of the EGR valve can be uniquely controlled only by the control signal so that the exact EGR control is effected in accordance with the operation condition of the internal combustion engine to improve the exhaust gas characteristic of the internal combustion engine. In addition, since no extra exhaust gas is recirculated to the engine, the drivability is also improved.

What is claimed is:

1. An electronically controlled EGR apparatus for controlling an EGR quantity through an EGR valve having a valve aperture, the degree of opening of which varies in response to movement of a diaphragm, the electronically controlled EGR apparatus comprising:
   an electronic circuit for producing a control signal having a predetermined duty ratio;
   a valve for regulating the flow of fluid between a first source of fluid and a pair of vacuum chambers of said EGR valve sectioned by said diaphragm, said control valve regulating the flow of fluid by a mechanism driven by said control signal from said electronic circuit; and
   a slit mechanism for changing a degree of communication between said pair of vacuum chambers and a second source of fluid in response to the movement of said diaphragm.

2. The electronically controlled EGR apparatus according to claim 1 wherein said electronic circuit is a microcomputer.

3. The electronically controlled EGR apparatus according to claim 1 wherein said control valve is a pair of flapper valves for selectively connecting said pair of vacuum chambers to said first source in accordance with said control signal from said electronic circuit.

4. The electronically controlled EGR apparatus according to claim 1 wherein said control valve is a pair of solenoid valves for selectively connecting said pair of vacuum chambers to said first source in accordance with said control signal from said electronic circuit.

5. The electronically controlled EGR apparatus according to claim 1 wherein said slit mechanism includes a plunger having one end fixed to said diaphragm at a center thereof and an opposite end slidably received within a sleeve fixed to a portion of a body of said pair of vacuum chambers, said plunger having passages independently communicating with said pair of vacuum chambers and a slit communicating with said passages at said opposite end of said plunger, said sleeve encircling said slit and having a groove at a predetermined level on an inner periphery thereof and an aperture at a portion of said groove communicating with the second source.

6. The electronically controlled EGR apparatus according to claim 1 wherein said slit mechanism includes a hollow slidable member fixed to said diaphragm at a center thereof, a guide member having one end thereof fixed to a body of said pair of vacuum chambers and an opposite end thereof slidably inserted in said slidable member, said guide member having an inside thereof connected to said second source and an opening connecting said second source to said pair of vacuum chambers through said inside of said guide member, said opening being arranged on a side of said guide member to change an opening area thereof to said pair of vacuum chambers in accordance with the movement of said diaphragm.

7. The electronically controlled EGR apparatus according to claim 5, wherein the first source is a vacuum and the second source is the atmosphere.

8. The electronically controlled EGR apparatus according to claim 6, wherein the first source is the atmosphere and the second source is a vacuum.

9. The electronically controlled EGR apparatus according to claim 6, wherein the width of the slit varies along a longitudinal length of the slit.

10. The electronically controlled EGR apparatus according to claim 9, wherein a first one of said pair of vacuum chambers is closer in the longitudinal direction to said valve aperture than a second one of said pair of vacuum chambers and the width of the slit increases toward said first vacuum chamber.

* * * * *